(12) United States Patent
Zhu et al.

(10) Patent No.: US 6,958,817 B1
(45) Date of Patent: Oct. 25, 2005

(54) METHOD OF INTERFEROMETRY WITH MODULATED OPTICAL PATH-LENGTH DIFFERENCE AND INTERFEROMETER

(75) Inventors: Weiguang Zhu, Singapore (SG); Zhihong Wang, Singapore (SG); Chen Chao, Singapore (SG); Ooi Kiang Tan, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 10/917,806

(22) Filed: Aug. 13, 2004

(51) Int. Cl.⁷ .............................................. G01B 9/02
(52) U.S. Cl. ...................................... 356/498; 356/502
(58) Field of Search .............................. 356/455, 458, 356/497, 498, 511, 516, 482, 486, 487, 493, 356/502

(56) References Cited

U.S. PATENT DOCUMENTS

| | | | |
|---|---|---|---|
| 3,772,457 A * | 11/1973 | Macovski .................... | 348/163 |
| 4,237,399 A * | 12/1980 | Sakamoto .................... | 310/317 |
| 4,289,403 A | 9/1981 | Allington | |
| 4,554,836 A | 11/1985 | Rudd | |
| 4,596,466 A * | 6/1986 | Ulrich ........................ | 356/497 |
| 4,697,926 A | 10/1987 | Youngquist et al. | |
| 4,762,417 A | 8/1988 | Wu et al. | |
| 5,231,325 A * | 7/1993 | Tamai et al. ........... | 310/323.12 |
| 5,245,408 A | 9/1993 | Cohen | |
| 5,394,233 A | 2/1995 | Wang | |
| 5,481,360 A | 1/1996 | Fujita | |
| 5,543,914 A | 8/1996 | Henshaw et al. | |
| 5,623,307 A * | 4/1997 | Kotidis et al. ............... | 356/493 |
| 5,777,742 A * | 7/1998 | Marron ........................ | 356/458 |
| 5,838,439 A | 11/1998 | Zang et al. | |
| 5,883,715 A | 3/1999 | Steinlechner et al. | |
| 6,020,965 A * | 2/2000 | Endo ........................... | 356/496 |
| 6,115,175 A * | 9/2000 | Maruyama et al. ......... | 359/355 |
| 6,195,168 B1 * | 2/2001 | De Lega et al. ............. | 356/497 |
| 6,456,380 B1 | 9/2002 | Naganuma | |
| 6,573,996 B1 | 6/2003 | Deliwala et al. | |
| 6,583,917 B2 | 6/2003 | Melloni et al. | |
| 6,616,353 B1 | 9/2003 | Helkey | |
| 6,721,094 B1 * | 4/2004 | Sinclair et al. ............. | 359/386 |
| 6,778,281 B2 * | 8/2004 | Ge .............................. | 356/511 |

OTHER PUBLICATIONS

J.F. Li et al., "Simple, high-resolution interferometer for the measurement of frequency-dependent complex piezoelectric . . . ", Rev. Sci. Instrum., 66 (1995), 215-21.
W.Y. Pan et al., "A sensitive double beam laser interferometer for studying high-frequency piezoelectric . . . ", Rev. Sci. Instrum., 60 (1989), 2701-2705.

* cited by examiner

*Primary Examiner*—Zandra V. Smith
*Assistant Examiner*—Patrick Connolly
(74) *Attorney, Agent, or Firm*—Dinsmore & Shohl LLP

(57) ABSTRACT

An interferometer has a source for generating a first beam and a second beam of a coherent monochromatic light having a wavelength λ, optical elements for directing the beams through two different optical paths having a path-length difference, a detector for detection of an interference signal of the beams, and a modulator for additionally varying the path-length difference periodically to allow the interference signal be detected near a path-length difference of λ/4 periodically. A maximum intensity change in the interference signal caused by a small period change of the path-length difference is thus detectable. The maximum intensity change caused by varying the path-length difference by at least λ/2 may also be detectable. The interferometer may be used to measure small vibrations, without pre-calibration and/or a feedback servo system for keeping the path-length difference near λ/4.

20 Claims, 3 Drawing Sheets

METHOD OF INTERFEROMETRY WITH MODULATED OPTICAL PATH-LENGTH DIFFERENCE AND INTERFEROMETER

FIELD OF THE INVENTION

The present invention relates to interferometers, particularly to method of interferometetry in which the optical path-length difference is modulated and interferometers.

BACKGROUND OF THE INVENTION

Interferometers are useful for non-contact measurement of small distance differentials such as the displacement or amplitude of a small vibration.

Typically, a two-beam interferometer includes a light source, typically a laser, that generates a coherent light having a wavelength $\lambda$. The light is split into two beams passing through two different optical paths. One of the beams is a probing beam which encounters and is reflected by a sample in its path and its optical path-length is dependent on the sample's position. The other beam is a reference beam which does not encounter the sample. The two beams are directed to re-converge at the end of their respective paths and the interference signal of the two beams is detected by a detector. The intensity of the interference signal is dependent on the phase difference in the two beams, and thus the optical path-length difference along the two paths. This, in turn, depends on the position of the sample. Thus, a change in the sample position causes a change in the intensity of the interference signal. Conversely, changes in the sample position can be extracted from the detected interference signal.

More specifically, the lack or presence of intensity changes can indicate whether the sample moves or vibrates along the path. The displacement of the sample is proportional to the changes in the amplitude of interference signal intensity.

In theory, the intensity of the interference signal is at a maximum or minimum when the path difference equals a multiple of $\lambda/2$ ($\delta x=n\lambda/2$), where n is an integer. Changes in the intensity of the interference signal are most sensitive to changes in $\delta x$ when the path difference equals an odd multiple of $\lambda/4$ ($\delta x=(2n+1)\lambda/4$). Changes in intensity are also approximately linearly proportional to small changes in $\delta x$ at or near a path difference of $\lambda/4$. As such, it is desirable to detect the interference signal at path difference near $\lambda/4$.

Some conventional interferometers include a path-length adjustor for adjusting the reference beam's path-length to keep $\delta x$ proximate $\lambda/4$ during measurement. As the optical path-length can be affected by environmental factors, such as air flow in the beam path and temperature fluctuation, such a path-length adjuster may include a closed loop servo controlled actuator which moves a mirror in the reference beam's path based on intensity feedback from the detector. Such feedback actuators have been used in some conventional Michelson and Mach-Zehnder interferometers.

The actuated mirror can also be used to calibrate the interferometers to determine the peak-to-peak intensity change when the sample is not vibrating or moving.

However, these conventional interferometers suffer a few drawbacks. For example, the closed loop servo feedback is complicated and expensive. Further, such interferometers require pre-calibration to determine the peak-to-peak intensity change and the initial $\lambda/4$ path difference. Moreover, calibration cannot be performed when the sample is vibrating and may not be accurate since the laser light intensity may change after calibration due to changes in the laser source or in the beam paths. These drawbacks limit the usefulness of the conventional interferometers equipped with an actuated mirror controlled by a feedback servo.

Therefore, an improved laser interferometer is needed to overcome one or more of the shortcomings of the conventional interferometers.

SUMMARY OF THE INVENTION

There is provided an interferometer having a modulator for varying the optical path-length difference between the reference beam and the probing beam periodically in addition to a perturbation in the optical path-length difference to allow the interference signal be detected near a quarter-wavelength path-length difference.

When the path-length difference varies periodically, the maximum intensity change in response to a small vibration can be periodically recorded at or near a path difference of $\lambda/4$. Since it is not necessary to keep the path difference $\lambda/4$ at all times during measurement, a complex and expensive closed loop feedback servo system is not necessary. Further, if the path-length difference is varied periodically by $\lambda/2$ or more, the peak to peak intensity change of the interference signal corresponding to a path difference of $\lambda/2$ can also be concurrently detected. Thus, pre-calibration of the peak-to-peak interference intensity is not necessary.

Therefore, an aspect of the invention provides an interferometer comprising a source for generating a first beam and a second beam of a coherent monochromatic light having a wavelength $\lambda$; optical elements for directing the first and second beams through two different optical paths having a path-length difference; a detector for detection of an interference signal of the first and second beams; and a modulator for additionally varying the path-length difference periodically to allow the interference signal be detected near a path-length difference of $(2m+1)\lambda/4$ periodically, m being an integer, so that a maximum intensity change in the interference signal caused by a small change of the path-length difference is detectable.

Another aspect of the invention provides a method of operating an interferometer. The method includes (a) generating a beam of laser light having a wavelength $\lambda$; (b) splitting the beam of laser light into a probing sub-beam and a reference sub-beam; (c) directing the probing and reference sub-beams through different optical paths having an optical path-length difference, the path of the probing beam being perturbed causing a perturbation in the optical path-length difference; (d) varying the optical path-length difference periodically in addition to the perturbation; and (e) detecting an interference signal of the sub-beams.

A further aspect of the invention provides a method of measuring a displacement of an object vibrating at a first frequency. The method includes (a) generating a beam of laser light having a wavelength $\lambda$; (b) splitting the beam of laser light into a probing sub-beam and a reference sub-beam; (c) directing the probing and reference sub-beams through different optical paths having an optical path-length difference, the probing beam being reflected from the vibrating object thus causing a perturbation of the optical path-length difference; (d) varying the optical path-length difference by at least $\lambda/2$ periodically in addition to the perturbation at a second frequency smaller than the first frequency; (e) detecting an interference signal of the sub-beams; (f) determining from the interference signal a maximum intensity change in the interference signal caused by the perturbation near a $\lambda/4$ optical path-length difference and a maximum intensity change in the interference signal caused by varying the optical path-length difference by $\lambda/2$; and (g) determining the maximum displacement of the object based on the maximum intensity changes.

Yet another aspect of the invention provides an interferometer comprising source means for generation of a first beam and a second beam of a laser light having a wavelength $\lambda$; optical means for directing the first and second beams through two different optical paths having a path-length difference; detecting means for detection of an interference signal of the first and second beams; and modulation means for varying the path-length difference periodically to allow the interference signal be detected near a $\lambda/4$ optical path-length difference such that a maximum intensity change in the interference signal caused by a perturbation of the path-length difference is detectable.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate exemplary embodiments of the invention

DETAILED DESCRIPTION

Figure 1:
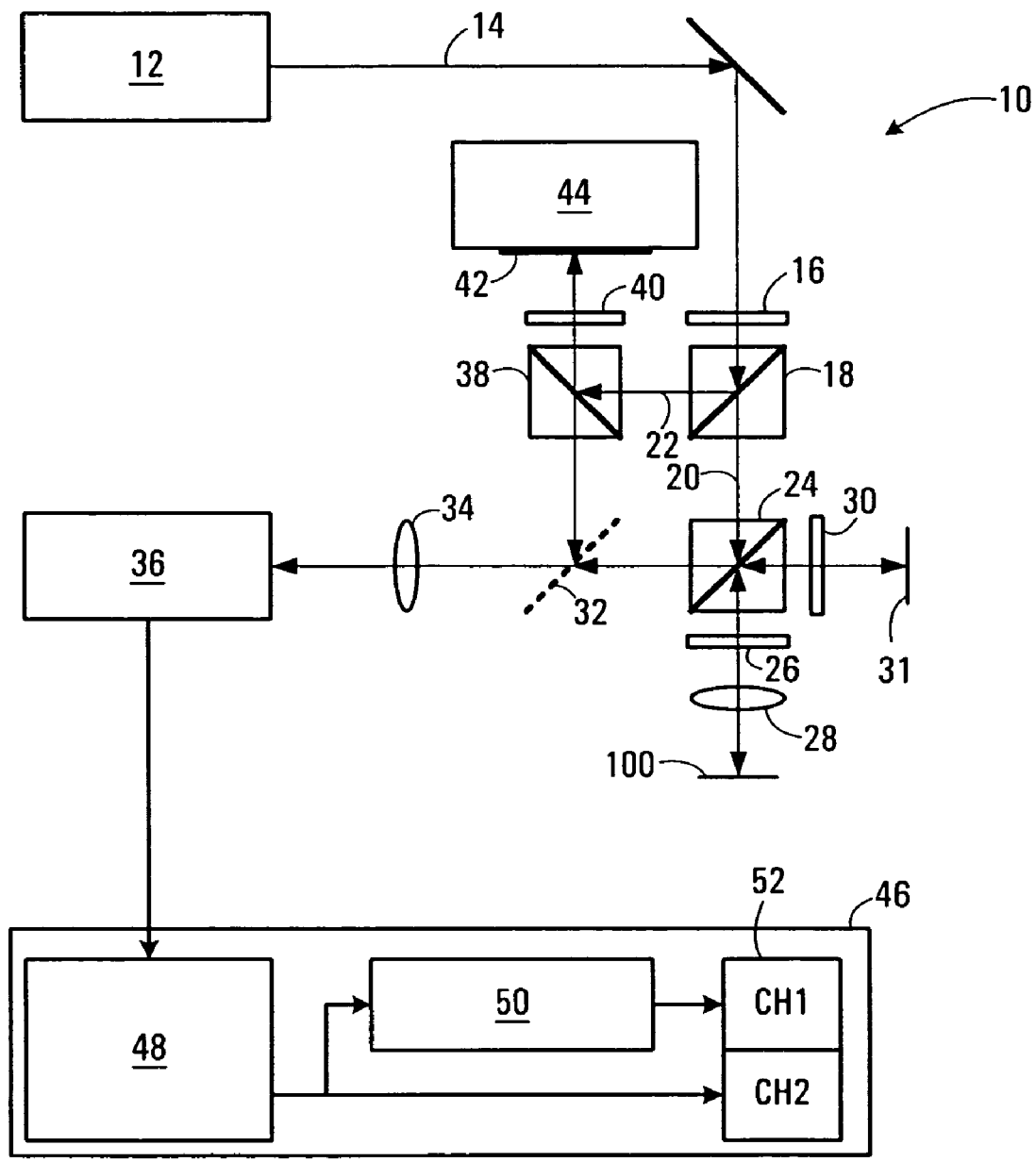
FIG. 1 is a schematic diagram illustrating a laser interferometer configured to measure vibrations of a vibrating object.

FIG. 1 illustrates schematically an exemplary interferometer 10 configured for non-contact measurement of a vibrating object 100.

Interferometer 10 includes a light source 12 for generating a coherent beam 14 of light having a wavelength $\lambda$. Light source 12 is typically a laser. Interferometer 10 may optionally include an optical aperture (not shown) located adjacent to the exit of the light source 12 to prevent laser light from being reflected back into the source 12.

A half-wavelength ($\lambda/2$) plate 16 is placed in the path of beam 14.

A first beam splitter 18 is placed downstream of $\lambda/2$ plate 16 and splits beam 14 into two sub-beams, a probing beam travelling along a path 20 and a reference beam travelling along a path 22. For example, first beam splitter 18 may allow the vertically polarized component of the beam 14 to pass through but deflect the horizontally polarized component, which is assumed below for convenience of description. First beam splitter 18 may also split beam 14 in other suitable manners known to a person of skill in the art.

A second beam splitter 24 is placed downstream of the probing beam, followed by a quarter-wavelength ($\lambda/4$) plate 26 and a focusing lens 28 for directing the probe beam onto vibrating object 100. To the right of the second beam splitter 24 are a $\lambda/4$ plate 30 and a fixed mirror 31. To the left of the second beam splitter 24 are, in order, a half-silvered mirror 32, an expanding lens 34, and a photo detector 36.

A third beam splitter 38 is placed downstream of reference beam 22 from the left side of the first beam splitter 18. Above third beam splitter 38 is a $\lambda/4$ plate 40 followed by a movable reflector 42, such as a mirror. The reflector 42 can be actuated by an actuator 44. Third beam splitter 38 is also aligned with the half-silvered mirror 32 below.

Photo detector 36 detects the combined light intensity of probing and reference beams arriving at detector 36.

Now, actuator 44 can move reflector 42 periodically and reciprocally along the optical path direction of the reference beam over a distance at least $\lambda/4$ long. This, in turn, varies the optical path-length difference ($\delta x$) between the two paths 20 and 22 of the probing and reference beams by at least a half laser wavelength ($\lambda/2$) periodically. As will be understood, since the reference beam is reflected back from reflector 42, the corresponding change in optical path-length doubles the distance the reflector moves. The actuator may be driven by a motor operated under an alternative current (AC) voltage having a triangular waveform, the advantages of which will become clear below.

Detector 36 is in communication with a signal analyser, or signal processing unit 46 for processing the signal detected at the detector 36. Signal processing unit 46 is capable of providing, based on a detected interference signal, an indication of its maximum intensity change proximate a $\lambda/4$ path-length difference, and an indication of its maximum intensity change when the path-length difference is varied by $\lambda/2$. The signal processing unit includes a current amplifier 48 for converting a current signal received from the detector to a voltage signal, a filter 50 for separating the voltage signal into a high frequency component signal and a low frequency component signal, and a display device 52 for displaying the high and low frequency component signals. Current amplifier 48 may be a pre-amplifier. Filter 50 may be a high-pass filter, as shown. Alternatively, it may include a low-pass filter or a notch filter. Display device 52 may be a multi-channelled oscilloscope or a digital signal analyser. Further, signal processing unit 46 may include a lock-in amplifier (not shown) placed between filter 50 and display device 52, the use and benefit of which will become clear below.

In operation, source 12 generates laser light 14 having the wavelength $\lambda$, which is directed towards $\lambda/2$ plate 16. After passing through the half-wavelength plate 16, the ordinary and extraordinary components of beam 14 will have a phase difference corresponding to an odd number of half-wavelength. In other words, the two components would be diagonally polarized. The orientation of $\lambda/2$ plate 16 can affect the proportional intensities of the probing beam and the reference beam detected at detector 36. Thus, this orientation can be aligned to balance the intensities at the detector, which may be necessary, for example, when the intensity of the probing beam is reduced due to various reasons such as poor reflection from the vibrating object 100.

Light 14 is split into the probing and reference beams at first beam splitter 18. The two beams are directed by various optical elements through paths 20 and 22, respectively, to detector 36.

The probing beam can initially pass through the second beam splitter 24 due to its initial vertical polarization and be focused onto a reflective surface of the vibrating object 100. The probing beam is then reflected back towards the second beam splitter 24. Its polarization orientation is rotated by 45° every time it passes through $\lambda/4$ plate 26. After two passes through the $\lambda/4$ plate 26, the polarization orientation of the probing beam becomes horizontal and is thus deflected by the second beam splitter 24 toward mirror 31, through $\lambda/4$ plate 30. The probing beam is then reflected back towards detector 36 through $\lambda/4$ plate 30, second beam splitter 24, the half-silvered mirror 32, and expanding lens 34. After passing through the λ/4 plate 30 twice, the polarization orientation of the probing beam becomes vertical again and is thus able to pass through second beam splitter 24.

Thus, optical path 20 of the probing beam is from source 12 to λ/2 plate 16, first beam splitter 18, second beam splitter 24, λ/4 plate 26, focus lens 28, vibrating object 100, focus lens 28, λ/4 plate 26, second beam splitter 24, λ/4 plate 30, fixed mirror 31, λ/4 plate 30, half-silvered mirror 32, expanding lens 34, to detector 36.

The reference beam is initially horizontally polarized and is deflected by second and third beam splitters 18 and 38 toward λ/4 plate 40, and then reflector 42. It is then reflected back passing again through λ/4 plate 40. Because its polarization orientation is now rotated by 90°, it passes through third beam splitter 38 and is deflected by half-silvered mirror 32 toward detector 36 through expanding lens 34.

Thus, optical path 22 of the reference beam is from source 12 to λ/2 plate 16, first beam splitter 18, third beam splitter 38, λ/4 plate 40, reflector 42, λ/4 plate 40, third beam splitter 38, half-silvered mirror 32, expanding lens 34, to detector 36.

The beams converge before reaching detector 36. At the half-silvered mirror 32, the probing beam and the reference beam are combined. The combined beams are magnified by the expanding lens 34 and projected onto detector 36 and are detected at the detector 36. As the two beams now have the same polarization, they interfere with each other at detector 36.

Figure 2:
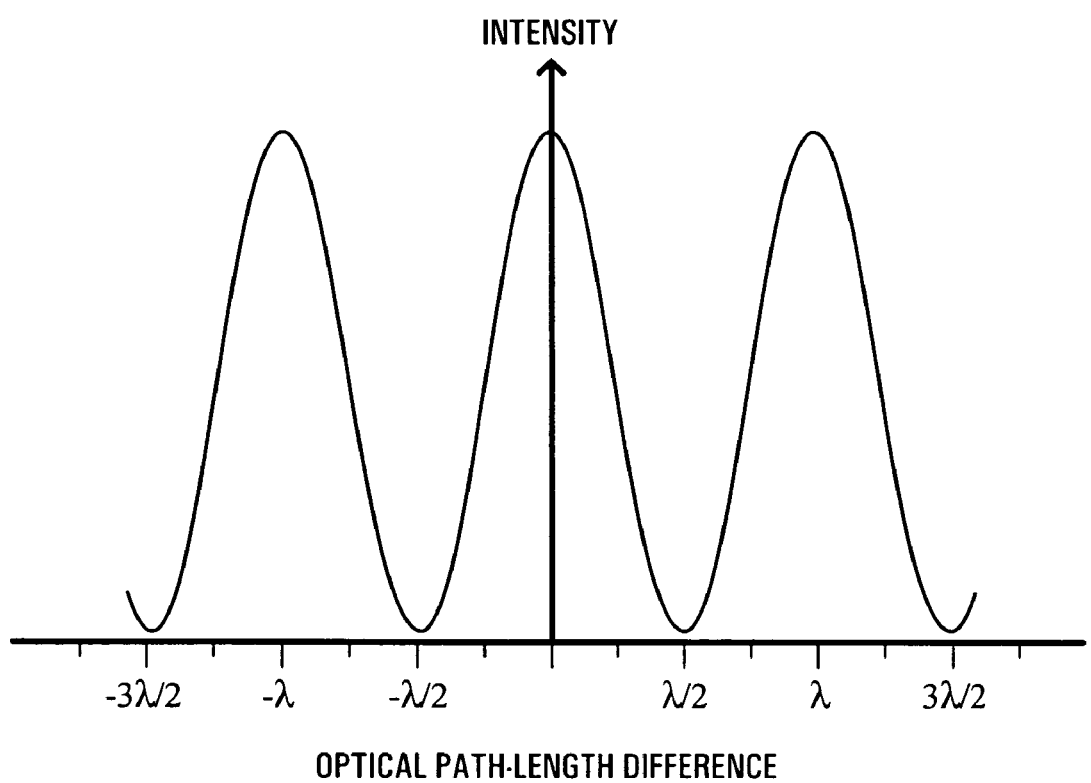
FIG. 2 is a line graph illustrating the dependence of intensity of an interference signal on the optical path-length difference.

The intensity of the interference signal at detector 36 is dependent on δx, which can be expressed in the form:

$$I = \tfrac{1}{2}(I_{max}+I_{min}) + \tfrac{1}{2}(I_{max}-I_{min})\cos(2\pi \delta x/\lambda) \tag{1}$$

where $I_{max}$ and $I_{min}$ are respectively the maximum and minimum intensity. This dependency is illustrated in FIG. 2.

Absent a difference in length of paths 20 and 22 (i.e. δx=0), the two beams will be in phase at detector 36. When there is a path-length difference, the two beams may be out of phase at detector 36. The change in the length of path 20 can cause a change in relative phase of the reference and probing beams The detected combined light intensity at detector 36 thus varies with the change in relative phase and path-length difference. As will be appreciated, the length of the path 20 is affected by movement of vibrating object 100. The sensitivity of changes in intensity to changes in path-length difference is greatest when the path-length difference is a quarter wavelength (λ/4).

Assuming the initial path-length difference is λ/4, when the vibrating object 100 is displaced by a distance d (toward source 12), the path-length difference is δx=¼λ−2d. When the displacement d is much smaller than λ, the change in interference intensity detected at detector 36 is linearly related to d, given by:

$$I = \tfrac{1}{2}(I_{max}+I_{min}) + \tfrac{1}{2}(I_{max}-I_{min})\sin(4\pi d/\lambda) \tag{2}$$
$$\approx \tfrac{1}{2}(I_{max}+I_{min}) + \tfrac{1}{2}(I_{max}-I_{min})4\pi d/\lambda$$

The change in optical path-length difference due to vibration of vibrating object 100 can be modulated by additionally varying the optical path-length difference by at least λ/2 periodically. The modulation can be accomplished by moving the reflector 42 periodically and reciprocally along the optical path direction of the reference beam path 22 over a distance longer than λ/4 at a frequency lower than the vibrating frequency of the vibrating object 100. Reflector 42 may be actuated using an AC voltage signal, which can be triangular-shaped.

As noted, and as can be appreciated from FIG. 2, the intensity (I) is most sensitive to further changes in δx when the path-length difference is λ/4 or odd multiples thereof (i.e. where δx=(2m+1)λ/4, m being an integer). The signal intensity peaks (i.e. either at a maximum or a minimum) when δx=nλ/2, n being an integer. When δx is varied periodically by at least λ/2 in addition to the changes caused by the vibration, the interference signal can be periodically detected proximate a λ/4 path-length difference and proximate its peaks. Further, a variation wider than λ can be advantageous in practice because the increased sampling range. Thus, it may be advantageous to vary the optical path-length difference for about (n+1)λ, where n is an integer from 1 to 7.

For convenience, the interference signal can be converted into current signal by detector 36, and further transformed to a voltage signal by current amplifier 48. The amplitude ($d_0$) of small periodical displacements of the vibrating object 100 is related to the detected voltage signal by the approximate expression:

$$d_0 = (\lambda/2\pi)^*(V_{out}/V_{p-p}), \tag{3}$$

where $V_{out}$ is the voltage corresponding to the maximum change in interference signal intensity due to changes in path-length difference caused by the vibration displacement, and $V_{p-p}$ is the peak-to-peak voltage corresponding to the maximum intensity change in the interference signal ($I_{max}-I_{min}$) caused by varying the path-length difference by λ/1. Voltages $V_{out}$ and $V_{p-p}$ can be measured using known devices or techniques, such as by using a dynamic signal analyzer or a lock-in amplifier connected to the photo detector 36.

For example, filter 50 may separate the voltage signal into a high frequency component signal and a low frequency component signal. Display device 52 may display the high and low frequency component signals separately. When reflector 42 oscillates at a frequency much slower than the vibration frequency of vibrating object 100, the amplitude of the low frequency signal represents $V_{p-p}$ and the maximum amplitude of the high frequency signal represents $V_{out}$. These signals can be displayed concurrently on display device 52 for visual comparison. Alternatively, the detected signal may be analysed by a computer in manners known to a person skilled in the art in order to determine the maximum displacement of the vibrating object.

Figure 3:
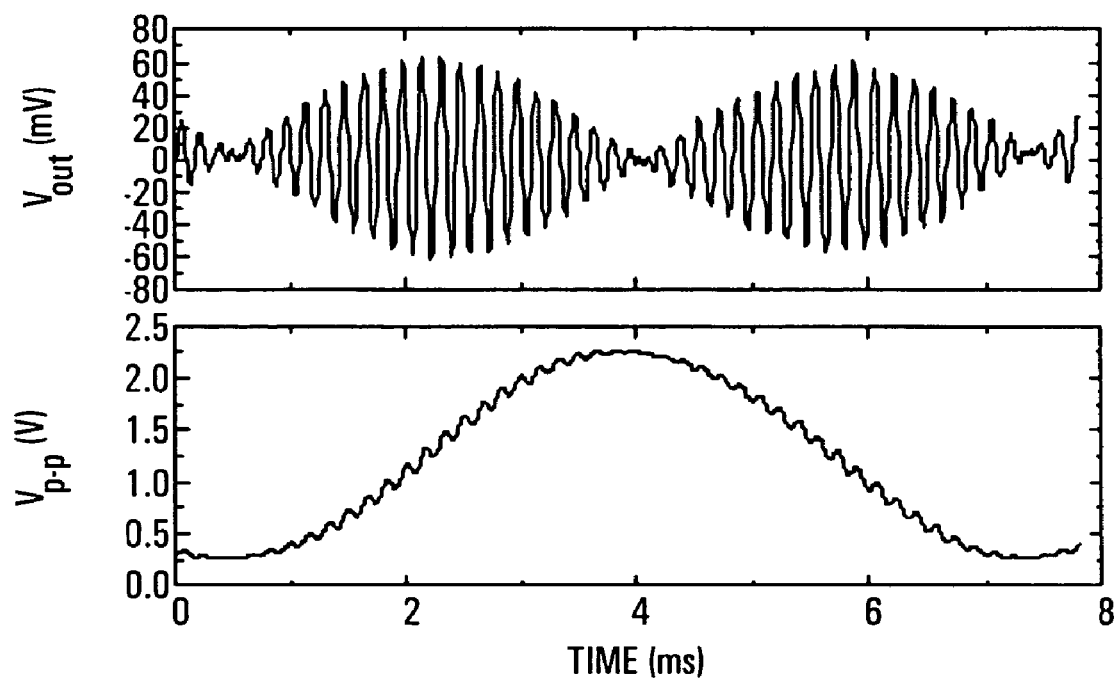
FIG. 3 is a display of voltage signals converted from an interference signal detected by the detector of FIG. 1.

In an exemplary embodiment, reflector 42 is actuated by a triangular wave of a fixed frequency and an amplitude adjusted to move the reflector 42 periodically and reciprocally over a distance equal to (n+1)λ/4, where n is an integer. The detected low frequency signal is a sinusoidal wave as shown at the bottom of FIG. 3. This low frequency signal can be used to extract $V_{p-p}$ which has a value equal to the difference between the maximum and minimum voltages shown. The detected high frequency signal is shown at the top of FIG. 3, and was obtained by filtering the voltage signal from the current amplifier by high-pass filtering. In this case, the value of $V_{out}$ is equal to the maximum amplitude of the modulated signal, which can be readily read out from the displayed image.

As illustrated in FIG. 3, the low and high frequency signals can be detected and displayed concurrently using an oscilloscope or a dynamic signal analyzer. The amplitudes of the two signals can also be measured simultaneously, thus the small displacement ($d_0$) of the vibrating object can be calculated according to equation (3).

Thus, it is not necessary to adjust the path-length of the reference beam based on feedback so as to keep δx at λ/4 at all times during measurement. It is also not necessary to pre-calibrate the maximum signal intensity. As will now be appreciated, environmental disturbances only affect the position at which the maximum amplitude occurs but do not affect the amplitude value. Thus, the maximum amplitude is immune from environmental drifts, and therefore, a stable measurement of $V_{out}$ can be obtained.

Further, test results show that if the vibrational is sinusoidal, which is normally the case when the vibration is small, lock-in technique can be used to further improve the resolution of measurement, for example to as low as $10^{-3}$ Å. To detect the signal using a lock-in amplifier, the AC power source for actuating reflector 42 may provide the reference frequency for lock-in. The time constant of the lock-in amplifier may be much shorter than the cycle time of the reflector 42. In such a case, a sinusoidal voltage output with an amplitude equal to the rms value of $V_{out}$ can be obtained from the lock-in amplifier.

Thus, interferometer 10 can be conveniently used for measurement of small displacements of a vibrating object.

As can now be understood, interferometer 10 may be modified while including (i) a source (such as source 12) for generating a probing beam and a reference beam of a coherent and monochromatic light having a wavelength λ; (ii) optical elements (such as elements 16, 18, 24–34, and 38–42) for directing the beams through two different optical paths having a path-length difference; (iii) a detector (such as detector 36) for detection of an interference signal of the two beams; and (iv) a modulator (such as actuator 44) for additionally varying the path-length difference periodically to allow the interference signal be detected near a path-length difference of (2m+1)λ/4 so that a maximum intensity change in the interference signal caused by a small change or perturbation of the path-length difference is detectable. The perturbation can be due to the vibration of a vibrating object that reflects the probing beam in its path.

As can be understood, in certain situations modulating the path-length difference by less than λ/2 can still allow periodic detection of the interference signal near a λ/4 path-length difference. For example, when the path-length drift or fluctuation due to environmental factors is small, it may be possible to pre-calibrate the interferometer to locate an initial λ/4 path-length difference and modulate the path-length difference around the pre-calibrated λ/4 path-length difference. In such a case, it may not be necessary to modulate the path-length difference by more than λ/2. The minimum modulation that is required in a particular application can be readily determined by one of skill in the art depending on the particular situation. For instance, a user may conduct test measurements to determine the minimum or suitable modulation. Alternatively, a user may simply increase the amount of modulation until an interference signal can be satisfactorily detected near a λ/4 path-length difference.

The modulator can be constructed or configured in any suitable form for periodically altering the optical path-length of a laser beam. As can be appreciated, in a different embodiment it is possible to place an actuated reflector in the path of the probing beam for varying δx. Further, it is also possible to alter both optical paths in order to vary δx.

The two paths can be arranged in different manners suitable for non-contact measurement of a small change in the path-length difference. For example, the typical arrangements in conventional Mach-Zehnder interferometers, Michelson interferometers, double-beam interferometers, or Laser Doppler Vibrometers may be used.

As can be appreciated, calibration of the interferometer 10 is not necessary, or it can be performed concurrently with the measurement of small vibrations. As such, intensity drifts of the light source/laser or fluctuation of optical path-length due to environmental factors would not negatively affect the accuracy of the measurement. Further, as can be appreciated by those skilled in the art, the probing beam can be scanned over the surface of the vibrating object without negatively affect the accuracy of the measurement. Thus, an areal/linear scanning measurement or scanning interferometer can be implemented in accordance with embodiments of the invention, wherein the measurement accuracy can be maintained at a high level even when the reflectivity of the vibrating object surface is not uniform.

Further, the interference signal can be detected proximate a path-length difference of λ/4 without a closed loop servo system to maintain the path-length difference of λ/4. Thus, such a servo system is not required for the interferometer 10.

Other features, benefits and advantages of the present invention not expressly mentioned above can be understood from this description and the drawings by those skilled in the art.

Although only a few exemplary embodiments of this invention have been described above, those skilled in the art will readily appreciate that many modifications are possible therein without materially departing from the invention. The invention, rather, is intended to encompass all such modification within its scope, as defined by the claims.

What is claimed is:

1. An interferometer comprising:
a source for generating a first beam and a second beam of a coherent monochromatic light having a wavelength λ;
optical elements for directing said first and second beams through two different optical paths having a path-length difference;
a modulator for additionally varying said path-length difference periodically to allow an interference signal of said first and second beams to be detected near a path-length difference of (2m+1)λ/4 periodically, m being an integer, so that a maximum intensity change in said interference signal caused by a small change of said path-length difference is detectable; and
a detector for detection of said interference signal including an indicator of optical interference near a path-length difference of (2m+1)λ/4.

2. The interferometer of claim 1, wherein said modulator is operable to vary said path-length difference by about (n+1)λ periodically, n being an integer.

3. The interferometer of claim 2, wherein n is from 1 to 7.

4. The interferometer of claim 1, wherein said optical elements comprise a movable reflector for reflecting one of said first and second beams in its corresponding optical path, and wherein said modulator comprises an actuator for moving said reflector periodically over a distance at least λ/4 long.

5. The interferometer of claim 4, wherein said actuator is controlled by a motor operated under an alternative current voltage having a triangular waveform.

6. The interferometer of claim 1, wherein said detector is a photo-detector.

7. The interferometer of claim 1, further comprising a signal processing unit in communication with said detector for processing said interference signal detected by said detector.

8. The interferometer of claim 7, wherein said signal processing unit comprises a signal analyzer capable of providing, based on said interference signal, an indication of said maximum intensity change caused by said small change of said path-length difference near a path-length difference of $(2m+1)\lambda/4$, and an indication of a maximum intensity change of said interference signal caused by varying said path-length difference by $\lambda/2$.

9. The interferometer of claim 8, wherein said signal processing unit further comprises a current amplifier for converting a current signal received from said detector to a voltage signal, a filter for separating said voltage signal into a high frequency component signal and a low frequency component signal, and a display device for displaying said high and low frequency component signals.

10. A method of operating an interferometer, said method comprising:
    generating a beam of laser light having a wavelength $\lambda$;
    splitting said beam of laser light into a probing sub-beam and a reference sub-beam;
    directing said probing and reference sub-beams through different optical paths having an optical path-length difference, the path of said probing beam being perturbed causing a perturbation in said optical path-length difference;
    varying said optical path-length difference periodically in addition to said perturbation to cause an optical path length difference periodically passing through $(2m+1)\lambda/4$, m being an integer; and
    detecting an interference signal of said sub-beams including an indicator of optical interference near a $(2m+1)\lambda/4$ optical path-length difference.

11. The method of claim 10, further comprising determining from said interference signal a maximum intensity change in said interference signal caused by said perturbation near a $(2m+1)\lambda/4$ optical path-length difference, m being an integer.

12. The method of claim 11, further comprising determining from said interference signal a maximum intensity change in said interference signal caused by varying said path-length difference by at least $\lambda/2$.

13. The method of claim 11, wherein said perturbation is caused by a vibrating object that reflects said probing sub-beam in its path.

14. The method of claim 13, wherein said varying comprises varying said optical path-length difference periodically at a frequency smaller than the vibrating frequency of said vibrating object.

15. The method of claim 14, wherein said varying comprises varying said path-length difference by about $(n+1)\lambda$ periodically, n being an integer.

16. The method of claim 15, wherein n is from 1 to 7.

17. The method of claim 11, wherein said directing comprises reflecting one of said first and second beams in its corresponding optical path with a reflector, and wherein said varying comprises moving said reflector periodically over a distance at least $\lambda/4$ long.

18. The method of claim 17, wherein said moving comprises actuating said reflector with an actuator driven by a motor operated under an alternative current voltage having a triangular waveform.

19. A method of measuring a displacement of an object vibrating at a first frequency, said method comprising:
    generating a beam of laser light having a wavelength $\lambda$;
    splitting said beam of laser light into a probing sub-beam and a reference sub-beam;
    directing said probing and reference sub-beams through different optical paths having an optical path-length difference, said probing beam being reflected from said vibrating object thus causing a perturbation of said optical path-length difference;
    varying said optical path-length difference by at least $\lambda/2$ periodically in addition to said perturbation at a second frequency smaller than said first frequency;
    detecting an interference signal of said sub-beams;
    determining from said interference signal a maximum intensity change in said interference signal caused by said perturbation near a $\lambda/4$ optical path-length difference and a maximum intensity change in said interference signal caused by varying said optical path-length difference by $\lambda/2$; and
    determining the maximum displacement of said object based on said maximum intensity changes.

20. An interferometer comprising:
    source means for generation of a first beam and a second beam of a laser light having a wavelength $\lambda$;
    optical means for directing said first and second beams through two different optical paths having a path-length difference;
    detecting means for detection of an interference signal of said first and second beams; and
    modulation means for varying said path-length difference periodically to allow detection of said interference signal caused by said perturbation near a $\lambda/4$ optical path-length difference and a maximum intensity change in said interference signal caused by varying said optical path-length difference by $\lambda/2$.

* * * * *